United States Patent [19]

Cozzo et al.

[11] 3,919,700

[45] Nov. 11, 1975

[54] MEMORY SYSTEM

[75] Inventors: Joseph Cozzo, Brooklyn; David K. Garrod, Yorktown Heights; Thomas G. Kazyaka, Yorktown Heights; Robert L. Melcher, Yorktown Heights; Norman S. Shiren, Ossining, all of N.Y.

[73] Assignee: International Business Machines Corporation, Armonk, N.Y.

[22] Filed: July 22, 1974

[21] Appl. No.: 490,527

[52] U.S. Cl. ..... 340/173 MS; 340/173 LS; 350/161

[51] Int. Cl.[2] ........................................ G11C 11/42

[58] Field of Search... 340/173 R, 173 MS, 173 RC, 340/173 LT, 173 LS; 350/161

[56] References Cited

UNITED STATES PATENTS

| | | | |
|---|---|---|---|
| 3,320,596 | 5/1967 | Smith | 340/173 MS |
| 3,698,794 | 10/1972 | Alphonse | 350/161 |
| 3,732,549 | 5/1973 | Barkley | 340/173 MS |

*Primary Examiner*—Terrell W. Fears
*Attorney, Agent, or Firm*—George Baron

[57] ABSTRACT

Piezoelectric photosensitive semiconductor crystals or semi-insulators are employed either to store or to process high frequency signals. Storage is accomplished in the crystal by a stable pattern of trapped electrons produced by the interference between two radio-frequency input signal pulses. The latter are applied successively to the crystal, after an initial illumination, causing ultrasonic waves to be generated. The ultrasonic wave of the first pulse, together with the electric field of the second, cause the trapped electrons to be redistributed in a pattern which has the same spatial variation as the ultrasonic wave. In effect, the information contained in the original pulse is stored in the crystal, the latter serving as a recording medium operating over the whole radio frequency range.

16 Claims, 8 Drawing Figures

MEMORY SYSTEM

BACKGROUND OF THE INVENTION

The phenomenon of persistent internal polarization (PIP) effects in photoconductive materials is described in detail in an article entitled "Persistent Internal Polarization" by J. R. Freeman et al. which appeared in the October, 1961 issue of Reviews of Modern Physics, Vol. 33, No. 4, pp. 553–573. This paper treats such internal polarization as due to an inhomogeneous charge distribution brought about by an external electric field acting on free carriers. Subsequent trapping of these carriers within the photoconductor gives a persistence to this distribution. There is no teaching in the Freeman et al. paper for inducing polarization employing r.f. fields. The storage phenomena are always considered as d.c. effects, with barrier layers and inhomogeneities formed at electrical contacts made with the crystal rather than within the crystal.

Examples of patents that combine PIP with d.c. operation are U.S. Pat. Nos. 3,407,394 to Hartke and 3,529,300 to McDaniel. In another contribution where a crystal was used to store information for future readout, namely, "Boson Echoes: A New Tool to Study Phonon Interactions" by J. Joffrin et al., published in the Physical Review Letters of Nov. 6, 1972, Vol. 29, No. 19 pp. 1325–1327, storage was not recognized to be due to the phenomenon of persistent internal polarization so they did not realize that an increase in such polarization could lead to longer memory times using the entire microwave frequency spectrum. They also observed storage for only one-tenth second.

The underlying mechanism by which charge, trapped in shallow donor sites, may be redistributed into a pattern which contains the spatial variation of an acoustic wave, is field induced ionization from the donors into the conduction band. At low temperatures, the dominant ionization mechanism is field induced tunneling, the probability for which has the form $$P(E) = A\,|E|^{1/4}\,e^{-\frac{B}{|E|}}$$

where $A$ and $B$ are functions of the trap depth and the mass of the trapped charge carrier, $|E|$ is the absolute value of the total electric field present in the crystal, and $$E = E_p \cos(\omega_1 t - k_1 x + \phi) + E_o \cos \omega_2 t$$

where $E_p$ is the piezoelectric field amplitude of a propagating acoustic wave and $E_o$ is the amplitude of an applied uniform field. The absolute value $|E|$ and hence also $P(E)$ contain various time and space dependent terms arising from cross products and squares of the two fields. In particular $P(E)$ contains a term which varies as $\cos(k_1 x - \phi)$ whenever $\omega_2 = \omega_1/(2n-1)$ where $n = 1,2,3 \ldots$. If a d.c. field is added to the total field as given above then $P(E)$ contains a $\cos(k_1 x - \phi)$ term whenever $\omega_2 = \omega_1/n$. The presence of such a term in $P(E)$ means that tunneling occurs at a greater rate from traps located where $(k_1 x - \phi) = 2m\pi$ and less so from points located one-half wavelength away where $(k_1 x - \phi) = (2m+1)\pi$, $m = 0,1,2,3 \ldots$. Thus the net trapped charge varies periodically in space with the period of acoustic wave.

GENERAL FEATURES OF THE INVENTION

A CdS crystal is prepared or grown so that it has high resistivity ( ≥ 100,000 ohm-cm) and is either doped with shallow donor impurities and annealed in sulfur vapor as is described in a paper entitled "Ultrasonic Amplification in Suflur Doped CdS" by D. L. White that appeared in the December 1965 issue of the Proceedings of the I.E.E.E., pp. 2157–8. The photosensitive semiconductor CdS thus has the two characteristics that make it desirable for use as a memory, namely, low electrical conductivity and shallow donors to provide electron traps. Visible light is applied to such a crystal to excite electrons therein, some of which are trapped on impurities in the CdS crystal. After such light excitation, an r.f. pulse, ranging from $10^2$ megacycles to $10^5$ megacycles is applied to the crystal so that the latter converts such pulse to an acoustic wave having the same frequency as the input r.f. pulse, such acoustic wave oscillating within the CdS crystal without affecting the separation of charges produced by the exciting light. During the life of said acoustic pulse, a second r.f. pulse is applied to the crystal. The ultrasonic wave of the first pulse, together with the electric field of the second pulse, cause the trapped electrons to redistribute into a pattern which has the same spatial variation as the ultrasonic wave. Information, contained in the applied pulses, is stored in the trapped electron pattern and is retrieved by applying a third r.f. pulse which causes the stored electron distribution to radiate an r.f. electric field. In the formation of a charge grating, the first pulse generates $(\omega,\vec{k})$ phonons via a piezoelectric effect. During the second pulse, the total electric field in the crystal is the sum of the piezoelectric field of the phonons generated by the first pulse and the applied field of the second pulse. The probability for field-induced tunneling from trapping states is a function of the absolute magnitude of this total electric field and, therefore, contains a term which is time independent but varies spatially as $\cos(\vec{k}\cdot\vec{r})$. This tunneling probability leads to an inhomogeneous trapped electronic space-charge grating, which also varies as $\cos(\vec{k}\cdot\vec{r})$. The electric field of the third pulse acts on the grating to generate a backward, (as well as a forward), propagating wave which is detected at the surface of crystal 2. In addition, when acted upon by the forward-propagating wave piezoelectrically generated at the crystal surface by the third pulse, the grating generates a uniform electric field. The output signal is the sum of these two outputs which occur simultaneously.

The memory to be described in further detail hereinafter has the highly desirable feature of not being time limited; that is, the initial write pulse and the second r.f. pulse, when it has been turned off, produce a spatially varying charge pattern that persists in the CdS crystal to be retrieved at will. Both phase and amplitude are stored, as well as time resolution of the signals which is preserved, in a relatively small crystal.

Consequently it is an object of this invention to achieve a storage device that can store both phase and amplitude information of many input signals in a relatively small volume or on a relatively small surface.

It is yet another object to achieve such storage of both phase and amplitude over a bandwidth of $10^7$ to $10^{11}$ Hz or higher.

Yet another object is to store information as an interference pattern in or on a piezoelectric crystal wherein one of the signals creating the interference pattern is acoustic and the other is electrical and readout of either the acoustic or electrical signal can take place as indicative of the information being stored.

It is a further object to employ the new memory device as an integrating device so that many input signals can be integrated.

It is still another object to employ a relatively small volume memory device wherein high frequency r.f. signals are processed with acoustic signals to perform memory, delay, convolution and correlation of such signals.

Figure 1:
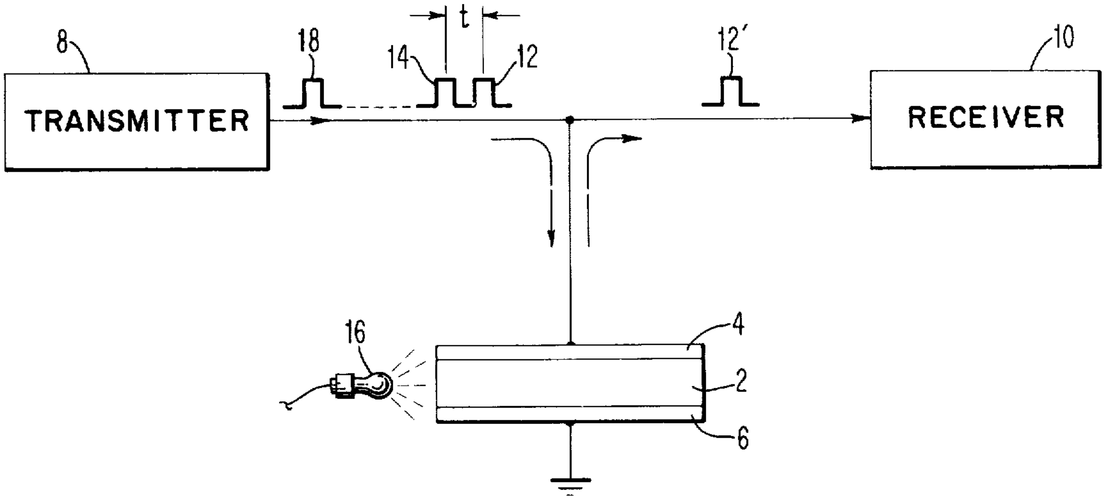
FIG. 1 is a schematic representation of the basic invention.

As is seen in FIG. 1, a crystal 2 is of a material that is photosensitive, piezoelectric, has high resistivity (resistivities >100,000 ohm-cm) and is suitably doped to provide electron traps. CdS is a particularly good example of such a crystal, but other II–VI compounds are the equivalent of CdS for the practice of this invention and CdSe and CdTe are examples of such substitutable compounds. In general, any material can be used which has the property of containing impurity sites or defects on which electrons can be trapped and such traps can be subsequently ionized by electric fields. The crystal 2 is interposed between two electrodes 4 and 6, the latter being grounded and the former being connected to a transmitter 8 of r.f. signals as well as a receiver 10 of such signals. Prior to transmitting any r.f. signals 12 and 14 to the crystal 2, visible light 16 is momentarily turned on to excite electrons within the crystal 2, which electrons become trapped in the shallow donor sites and remain in the traps, substantially uniformly distributed throughout the CdS crystal 2.

The first r.f. pulse 12, when it impinges onto the crystal 2 through electrode 4, generates ultrasonic waves at the surface of the crystal 2 because the latter is piezoelectric. The waves propagate into the body. These ultrasonic waves have the same frequency as that of the r.f. signal 12. At a time $t$ later, the second r.f. pulse 14 is applied to the crystal 2 containing the acoustic or ultrasonic wave. The ultrasonic wave due to the first pulse 12, together with the electric field of the second pulse 14, cause the trapped electrons in crystal 2 to redistribute into a pattern which is the correlation of pulses 12 and 14. At low temperatures, i.e., <30°K, these charge patterns are stored, and at temperatures of approximately 4°K, storage lasts for many months. However, there is no reason to doubt that by proper choice of piezoelectric semiconductors one may obtain long-lived charged patterns at room temperatures. At 200°K, in some samples, storage has been observed to last for 2 milliseconds. The information contained in the original pulse 12 is stored so that crystal 2 serves as a recording medium operating over the radio-frequency range. When a third r.f. pulse 18 is applied to crystal 2, the information representative of the original stored pulse 12 is retrieved from crystal 2 and is sensed by receiver 10. The third pulse 18 causes the stored electron distribution or charge pattern to radiate an electric field 12′ whose pulse shape is the convolution of the stored charge pattern and pulse 18.

For a more detailed discussion of the terms correlation and convolution as they are used in the description of this invention, see U.S. Pat. No. 2,760,172 which issued to C. F. Quate on Sept. 18, 1973.

Figure 2:
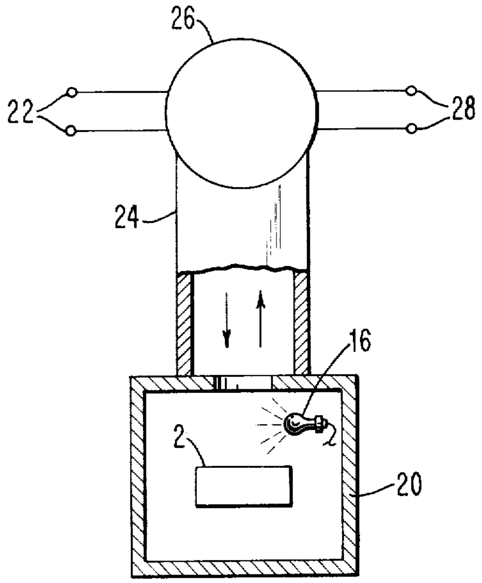
FIGS. 2, 3, and 3*a* are cavity resonators in which the invention can be used.

The crystal 2 serving as a memory can be placed in a microwave cavity 20 (See FIG. 2) with a source of visible light 16 for exciting the crystal 2 at will prior to the processing of r.f. signals. Such r.f. signals will come into the cavity 20 via input terminals 22 and be guided by wave guides 24 into crystal 2. Circulator 26 is a conventional isolating means for segregating signals entering the cavity 20 from those leaving it at output terminals 28. At the present stage of this invention, the time lapse between pulses 12 and 14 should not be more than 50 microseconds in that, with the crystals 2 now available, the acoustic wave in crystal 2 will have lost too much of its energy to be responsive to r.f. signal 14. However, it is within the purview of this invention to tolerate greater time periods between signals 12 and 14 as better crystals are discovered.

Figure 3:
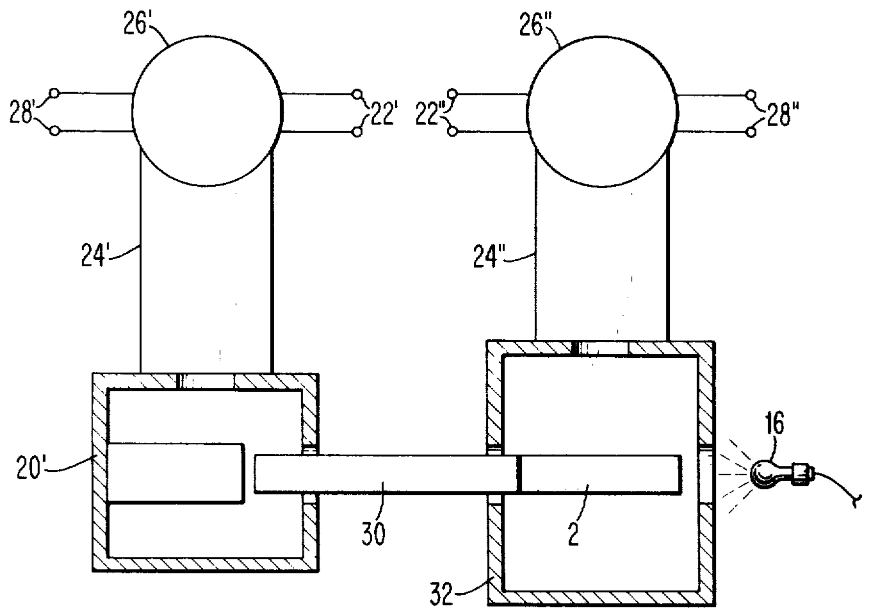
Figure 4:
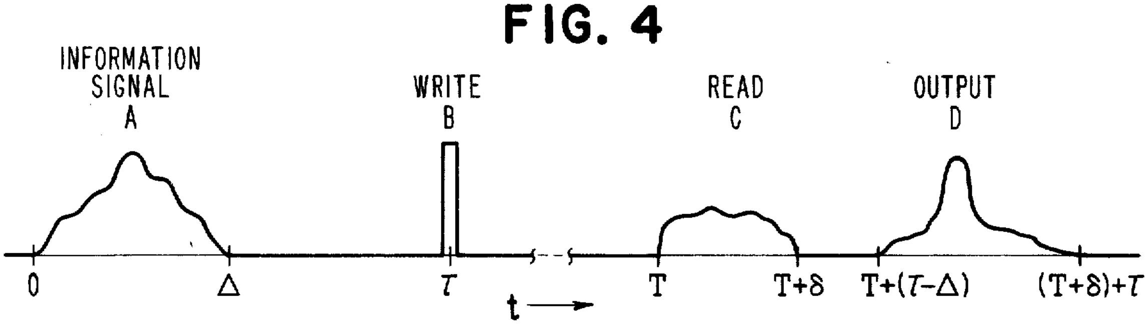
FIG. 4 indicates a sequence of pulses that can be used to make the invention operate as a correlator and FIG. 5 shows another sequence of pulses that can be used to make the invention operate as an autocorrelator.

FIG. 3 is another manner in which signals can be processed using the novel storage mechanism of this invention and FIG. 4 is a pulse sequence that can be applied to the double cavity structure of FIG. 3. Initially, crystal 2 is excited by a visible light source 16. An r.f. signal pulse A, which is phase and/or amplitude modulated, is applied as an input to terminals 22′ at time $t=0$ through circulator 26′ and waveguide 24′ into the microwave cavity 20′. Such r.f. signal pulse A is converted into a sound wave by a transducer 30, e.g., a quartz crystal, which sound wave propagates into storage crystal 2, wherein the transducer 30 and crystal 2 are connected by a suitable bonding material such as indium. At a time $t$, when signal A is completely inside the cavity resonator region 32, a write pulse B is applied at inputs 22″. Pulse B is intense and short as compared with the envelope variations of signal A. The latter signal is now stored in the form of a charge distribution which varies, spatially, identically with signal pulse A. A read signal C, which is another r.f. pulse, is applied as an interrogating pulse at a later time T, which can be anytime later than $\tau$ up to 2 months, to either input 22′ or 22″. If the interrogating signal C is applied to input 22′, an output signal pulse D appears at output terminals 28″. If the interrogating pulse C is applied at time T to input terminals 22″, then output signal pulse D will appear at output terminals 28′. As is seen in FIG. 4, if the width of pulse A is 0–Δ, and write pulse B is a delta function having negligible width, then the width $([T+\delta]-T)=\delta$ of the interrogating pulse will produce an output pulse D whose width is $[(T+\delta)+\tau]-[T+(\tau-\Delta)]=\delta+\Delta$. The envelope of pulse D is the correlation of the envelopes of A and C.

Figure 5:
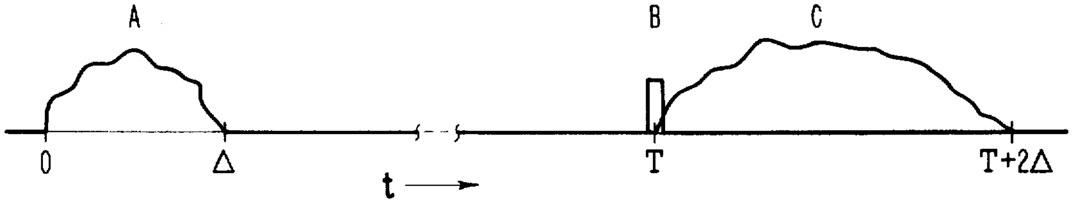

FIG. 5 illustrates the pulse sequence employed when the present invention is operated as an auto-correlator. The input pulse A of FIG. 5, having a width Δ, is applied to input terminals 22 of FIG. 2 at time $t=0$, after crystal 2 has been excited with light source 16. Such input pulse A is preferably of a high intensity and will generate an acoustic wave of the same frequency in the piezoelectric crystal 2. The combination of this acoustic wave and the uniform electric field of pulse A creates a stored space charge pattern. When a delta pulse B is applied to the crystal 2 at input terminals 22 at time T, output pulse C occurs immediately and has a width of 2Δ, and is the correlation of pulse A with itself.

Storage was obtained after illumination with visible light of any wavelength, and is particularly strong after illumination with 6,300 – 7,000 A radiation. A stored charge pattern can be erased by visible light. Erasure of the pattern can also be accomplished by applying very strong electric field pulses. In addition, the traps can be emptied, thereby inhibiting the ability to form a stored charge pattern, by infrared light of wavelength 8,000 to 9,000 A.

Figure 3A:
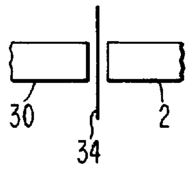
Figure 6:
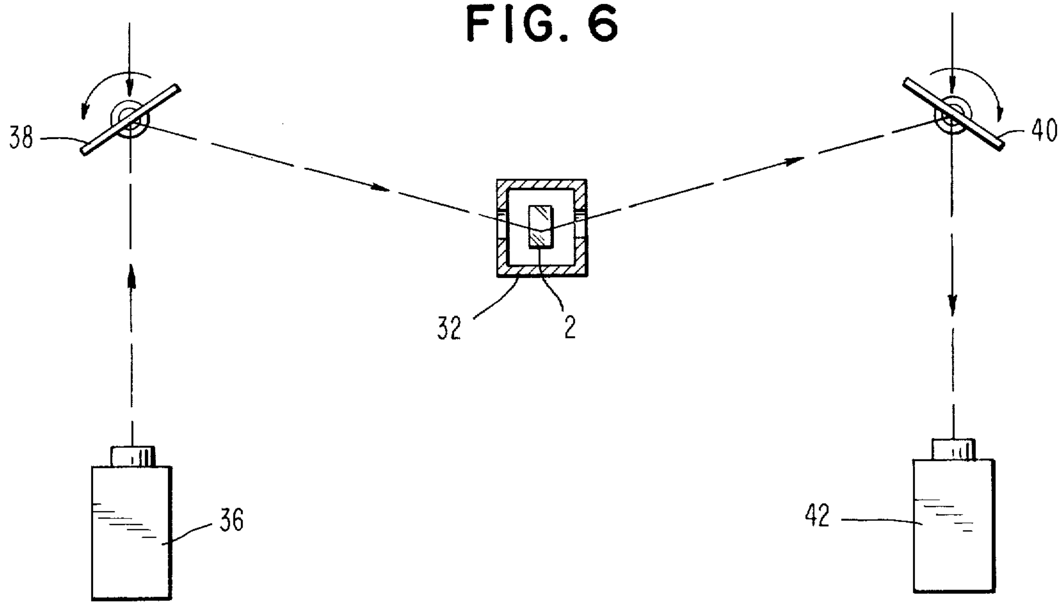
FIG. 6 is an embodiment of the invention for recording and reading holograms.

FIG. 6 illustrates the manner in which the invention can be employed to store an acoustic hologram which is read out optically at the will of the operator. The cavity 32 of FIG. 3 is shown schematically in FIG. 6. Such cavity 32 is modified so that an object 34 is placed between transducer 30 and piezoelectric crystal 2 (See FIG. 3A). If the r.f. signal A of FIG. 4 is a monochromatic flat-topped pulse, after it has been converted to an acoustic wave by transducer 30, then the signal entering crystal 2 is a wave that has been scattered or diffracted by the object 34. When the r.f. write pulse B is applied during the presence of this diffracted wave, the space charge grating created in crystal 2 varies with the phase and amplitude of the scattered wave produced by the object 34. Effectively, a holographic image of object 34 is stored. Associated with the stored charge, there is a variation in the optical refractive index of crystal 2. Therefore, when a laser beam from laser 36 is directed by rotating mirror 38 into crystal 2 at the Bragg diffraction angle, according to the teachings set forth in the article "Holographic Recording Lithium Niobate" by J. J. Amodei et al. that appeared in the RCA Review, Vol. 33, March 1972, pp. 71–93, the stored acoustical image in crystal 2 can be reflected from rotating mirror 40 onto a suitable detector 42.

Figure 7:
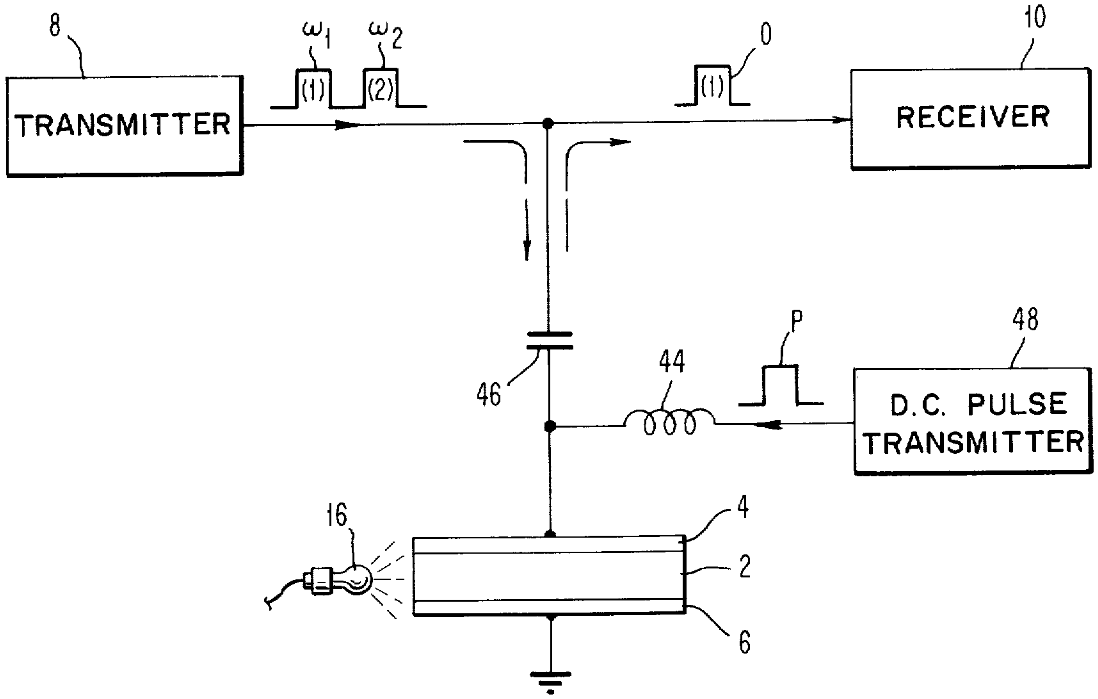
FIG. 7 is an embodiment of the invention using d.c. signals in conjunction with r.f. signals to achieve storage.

In FIG. 7, the total field E on crystal 2 is expressed as $E = E_{dc} + E_p \cos(\omega_1 t - k_1 x + \phi) + E_2 \cos \omega_2 t$ where $E_{dc}$ is the d.c. pulse that is sent by the d.c. pulse transmitter through inductor 44 and capacitor 46 to crystal 2. The expression $E_p \cos(\omega_1 t - k_1 x + \phi)$ is the information-bearing pulse whose frequency is $\omega_1$ and $E_p$ is the piezoelectric field amplitude of the propagating acoustic wave through crystal 2 produced by pulse (1). $E_2 \cos \omega_2 t$ is the reference pulse (2) that impinges on crystal 2. The d.c. pulse is applied simultaneously with applied r.f. pulse (2) having a frequency $\omega_2$. Two conditions may apply with respect to $E_{dc}$, namely, it exists or it does not exist.

Assuming (A) $E_{dc} = 0$, then $\omega_2 = \omega_1/(2n-1)$, where $n = 1,2,3,4, \ldots$, etc. In such case, storage can take place without applying a d.c. field so long as $\omega_2$ is equal to $\omega_1$ or is only an odd fraction of $\omega_1$, that is, $\omega_2 = 1/3\ \omega_1$, $(1/5)\ \omega_1$, etc. When (B) $E_{dc} \neq 0$, then $\omega_2 = \omega_1/n$, where $n = 1,2,3$, etc. Thus if $\omega_2$ is preselected to be an even fraction of $\omega_1$, then according to condition (A), no storage can take place unless a d.c. field is applied simultaneously with signal pulse (2) to crystal 2. In accordance with condition (B), when a d.c. pulse P is emitted by transmitter 48, then the invention becomes more flexible, allowing a greater choice of $\omega_2$. Output signal pulse O sensed by receiver 10 will produce the information carried by pulse (1) at frequency $\omega_1$ when stored by pulse (2) at frequency $\omega_2$ and read out by a pulse, similar to pulse 18 of FIG. 1, at frequency $\omega_1$.

The basic invention can be modified to produce delay lines, convolvers, surface storage devices capable of being read out as photocopy, electronically variable acoustic transducers, processing of radar signals, etc. The following theoretical discussion of the operating mechanism of the invention will readily assist one in realizing the many applications to which the invention can be applied as a processor of r.f. signals and/or acoustic waves. In general, a forward-propagating strain wave of frequency $\omega$ and wave vector $\bar{k}$, identified notationally as $(\omega,\bar{k})$, interacts with an electric field $(\omega,0)$ to produce a redistribution of electronic space charge by an electric-field-induced quantum-mechanical tunneling from shallow electron traps, or by other field-dependent detrapping mechanisms. The redistributed charge varies spatially on a scale of the acoustic wavelength, i.e., charge gratings are formed and may be stored for long time periods.

The fact that crystals 2 of the same compound obtained from different sources produced different results indicates that the observed phenomena are associated with the presence of defects in the crystals 2. Besides CdS, the phenonema were observed in the polar crystal CdSe, as well as in nonpolar crystal CdTe ($T_d$ symmetry). To obtain representative data for demonstrating the operativeness of the invention, a crystal 2 of CdS was used having a resistivity approximately $10^{11}$ ohm-cm at a temperature of 300°K, was photosensitive and was sulfur-compensated. Both *a*-cut and *c*-cut single-crystal rods or plates 2 were placed in the electric field regions of re-entrant or rectangular X-band cavities 20 (FIG. 2) or 21' or 32 (FIG. 3) or between parallel plates 4 and 6 (FIG. 1). The frequency of the r.f. pulses in the cavity was varied from 200 megahertz to 9,000 megahertz and that between the parallel plates 4 and 6 was ≈ 50–700 megahertz.

Experimental results show that the amplitudes of the observed output signals were sharply dependent upon illumination of the crystal 2 with light. When the crystal 2 was in thermal equilibrium in the dark, no output signals were observed after input of r.f. signals such as signals 12 and 14. During and immediately following illumination of crystal 2 with visible light 16, strong signals were generated. The decay time for reading the charge pattern in the dark varied from 2 milliseconds at 200°K to at least a month at 4.2°K.

It was also found that the output signal amplitudes were dependent on the wavelength λ of the illuminating radiation 16.

In summary, illumination of the crystal 2 causes the filling of shallow electron traps ($E_T \approx 10_{eV}^{-2}$) near the conduction band. Visible radiation is required for this. Such traps have lifetimes of months at liquid-helium temperatures.

The novel memory system and information processor is the analog of a holographic storage wherein the information-bearing beam is the acoustic signal generated in crystal 2 by r.f. signal 12 and the second r.f. pulse 14 is the reference beam that, in conjunction with the generated acoustic signal, produces a "frozen" pattern due to the interference of such signals. Subsequent readout of the information-bearing signal can be done at will. Erasure of the stored pattern can be carried out by applying infra-red or white light to the crystal.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for obtaining storage of information comprising a material containing defect sites on which electrons can be trapped and such traps can be subsequently ionized by electric fields, means for applying charging light to said material to fill electron traps therein, means for propagating an r.f. acoustic pulse through said material wherein said acoustic pulse serves as an information-bearing pulse, and means for applying a second r.f. pulse to said material during the presence of said acoustic pulse so as to write said information-bearing pulse as a stable pattern of trapped electrons having the same spatial variations as said acoustic pulse so that the phase and amplitude of said acoustic pulse is retained in the material.

2. The device of claim 1 wherein said material is CdS.

3. The device of claim 2 wherein said CdS is sulfur doped and has a resistivity ≥ 100,000 ohm-cm.

4. A device for storing a holograph acoustically comprising a highly resistive piezoelectric semiconductor, means for providing electron traps in said semiconductor, a phase and amplitude modulated r.f. pulse applied to said semiconductor, the latter converting said pulse to an acoustic wave of the same frequency as said r.f. pulse, and a second r.f. pulse applied to said crystal during the presence of said acoustic wave so as to store said acoustic pulse in the form of a charge distribution of electrons which varies in phase and amplitude as said first r.f. pulse.

5. The device of claim 1 wherein said second r.f. pulse is very much shorter in duration than said first r.f. pulse.

6. The device of claim 1 including means for applying an r.f. pulse of the same frequency as said first r.f. pulse to said stored charge pattern so as to read out the stored acoustic pulse.

7. The device of claim 1 including means for applying a second acoustic pulse of the same frequency as said first acoustic pulse to said stored charge pattern so as to read out the stored second r.f. pulse.

8. A device for obtaining the storage of a plurality of information-bearing r.f. signals comprising a fully anion-compensated piezoelectric crystal such as CdS, means for applying charging radiation to said crystal to fill electron traps therein, and means for propagating an r.f. acoustical pulse through said crystal to serve as an information-bearing pulse, and means for applying a plurality of consecutive r.f. pulses, having the same frequency as said acoustic wave, to said crystal during the presence of said acoustic pulse so as to form a plurality of charge distributions of electrons each such distribution varying in phase and amplitude with each of said plurality of r.f. pulses.

9. The device of claim 1 wherein said r.f. frequencies are in the range of 10 megahertz to 100 gigahertz.

10. In a memory device for obtaining storage of information comprising a fully anion-compensated piezoelectric crystal having a resistivity of 100,000 ohm-cm or greater, means for filling electron traps therein, means for propagating an r.f. acoustical pulse through said crystal, means for applying a second r.f. pulse of the same frequency to said crystal at a time $\tau$ after the entry of said acoustic pulse so as to write said acoustic pulse as a stable pattern of trapped electrons having the same spatial variations as said acoustic pulse, and means for applying a third r.f. pulse having the same frequency as said prior pulses to said crystal at a time T whereby said acoustic pulse is read out from the crystal at time $T + \tau$.

11. A device for reading the information stored in the crystal of claim 4 comprising a source of laser light, means for directing said light onto said crystal containing said stored holograph, whereby said crystal diffracts said laser light in accordance with the information stored by said crystal, and means for detecting such diffracted light.

12. A device for obtaining storage of information comprising a material containing defect sites on which electrons can be trapped and such traps can be subsequently ionized by electric fields, means for filling said electron traps, means for propagating an r.f. acoustic pulse having a frequency $\omega_1$ through said material wherein said acoustic pulse serves as an information-bearing pulse, means for applying a second r.f. pulse of a frequency $\omega_2$ to said material during the presence of said acoustic pulse so as to write said information-bearing pulse as a stable pattern of trapped electrons having the same spatial variations as said acoustic pulse so that the phase and amplitude of said acoustic pulse is retained in the material, and means for applying a d.c. pulse to said material simultaneously with the r.f. write pulse having the frequency $\omega_2$ so that storage occurs at frequencies that are related by $\omega_2 = \omega_1/n$, where $n$ is an integer other than zero.

13. The device of claim 4 wherein said second r.f. pulse is very much shorter in duration than said first r.f. pulse.

14. The device of claim 4 including means for applying an r.f. pulse of the same frequency as said first r.f. pulse to said stored charge pattern so as to read out the stored acoustic pulse.

15. The device of claim 12 including means for applying a pulse at the frequency of said acoustic pulse to said material so as to read out said stored acoustic pulse.

16. The device of claim 12 including means for applying a second acoustic pulse of the same frequency as said first acoustic pulse to said material so as to read out the stored second r.f. pulse.

* * * * *